US005518543A

United States Patent [19]

Pietrowski et al.

[11] Patent Number: 5,518,543

[45] Date of Patent: May 21, 1996

[54] APPARATUS FOR SPRAYING AT A SPRAYING STATION ALIGNED WITH A CONTINUOUSLY MOVING CONVEYOR BELT

[75] Inventors: Michael L. Pietrowski; Gordon D. Norlin; Thomas J. Mohr; Charles R. Williams; Thomas J. Haug; John W. Herrmann, all of Manitowoc, Wis.

[73] Assignee: Anchor Hocking Corporation, Freeport, Ill.

[21] Appl. No.: 108,026

[22] Filed: Aug. 17, 1993

[51] Int. Cl.$^6$ .............................. B05B 1/28; B05B 13/02; B05C 13/00; B65G 47/00

[52] U.S. Cl. .......................... 118/313; 118/318; 118/319; 118/322; 118/324; 118/326; 118/500; 118/DIG. 7; 198/346.2; 198/345.1; 454/50

[58] Field of Search .................................... 118/313, 315, 118/318, 319, 320, 322, 324, 326, 500, DIG. 3, DIG. 7, DIG. 8; 198/345.1, 346.2; 454/50, 63; 65/60.1

[56] References Cited

U.S. PATENT DOCUMENTS

| | | | |
|---|---|---|---|
| 1,185,889 | 6/1916 | Eberhart | 118/318 |
| 2,341,477 | 2/1944 | Pearson | 118/318 |
| 2,426,391 | 8/1947 | Emerson | 118/320 |
| 3,062,177 | 11/1962 | Henrickson | 118/318 |
| 3,251,707 | 5/1966 | Blank et al. | 65/60.1 |
| 3,291,630 | 12/1966 | Deyle et al. | 118/318 |
| 3,311,085 | 3/1967 | Smith | 118/318 |
| 3,418,099 | 12/1968 | Carter et al. | 65/284 |
| 3,425,396 | 2/1969 | Margola | 118/326 |
| 3,452,709 | 7/1969 | Hartmeister et al. | 118/318 |
| 3,965,854 | 6/1976 | Scheiber | 118/322 |
| 4,382,422 | 5/1983 | Eddy et al. | 118/318 |
| 4,418,644 | 12/1983 | Young | 118/318 |
| 4,638,756 | 1/1987 | Collmann | 198/345.1 |
| 4,974,716 | 12/1990 | Yuri et al. | 198/345.1 |
| 5,078,313 | 1/1992 | Matheson et al. | 118/318 |
| 5,252,113 | 10/1993 | Jung et al. | 65/160 |

*Primary Examiner*—David L. Lacey
*Assistant Examiner*—Steven P. Griffin
*Attorney, Agent, or Firm*—Baker & McKenzie

[57] ABSTRACT

A spraying apparatus having a continuously moving conveyor belt which brings a vessel rim down to a spraying station, arrests movement of the vessel and aligns it with a vacuum gripping head, grips the vessel bottom and lifts and presents the vessel to a sprayer, rotates the vacuum gripped vessel rapidly to apply a plurality of thin layers of coating, and returns the coated vessel to the conveyor and releases the grip on the vessel so that the continuously moving conveyor can discharge the coated vessel from the spraying station.

11 Claims, 8 Drawing Sheets

Fig. 4.
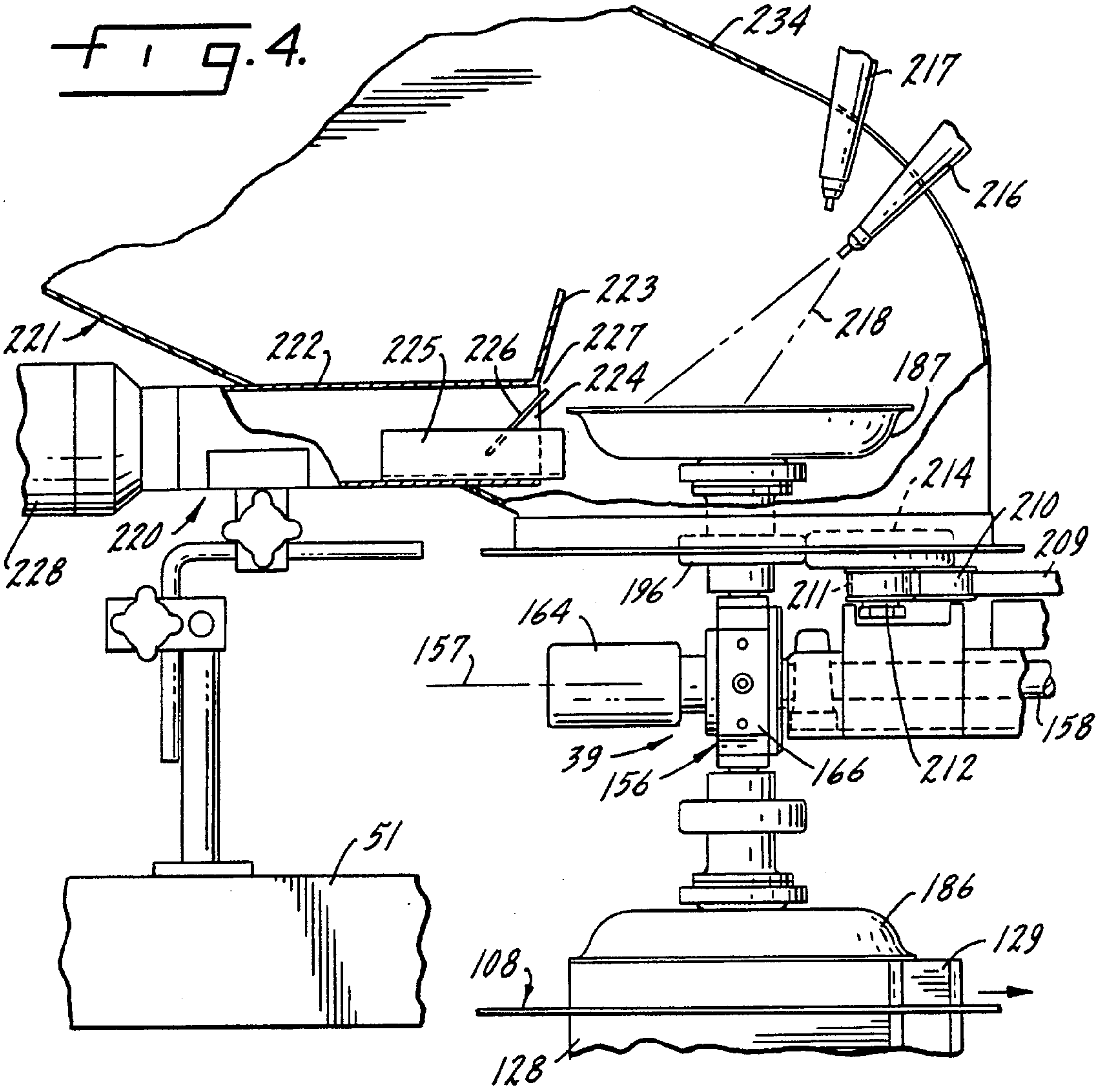
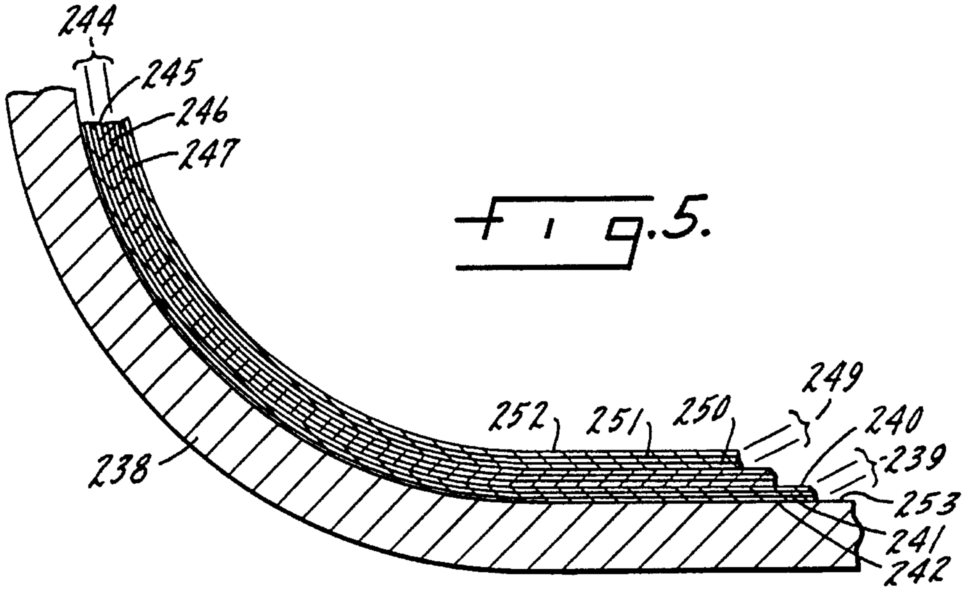
Fig. 5.

APPARATUS FOR SPRAYING AT A SPRAYING STATION ALIGNED WITH A CONTINUOUSLY MOVING CONVEYOR BELT

This invention relates to a unique method and apparatus for coating articles which are conveyed from one work station to another in a mass production manufacturing system, and to the product produced thereby. It is particularly directed to a method and apparatus for quickly and efficiently applying a large number of layers of coating to articles, such as cooking vessels, in a continuous production system which minimizes overspray of the coating. Although the applications are many, for convenience of description the invention will be described in terms of the spraying of multiple layers of coating on the interior of frying pans. It should be understood, however, that this specific application is chosen for illustrative purposes only.

BACKGROUND OF THE INVENTION

Production line systems for applying coatings to such articles as cookware vessels are well-known. In general, such systems include a conveying means for bringing the article to be coated to the coating station, means for coating the article at a coating station or in a coating zone, and conveying means for removing the just-coated article at the conclusion of the treatment in the coating station or zone. All such systems fall short of an ideal system in one or more respects however.

At this writing, standard industry practice includes the use of operator initiated means, almost always manual labor, to properly position the pan to be coated for the following spraying operation. If the interior of a pan is to be coated by spraying, for example, the fingers of the line attendants must touch and handle the pan to orient it into the proper position. Such touching and physical manipulating can give rise to imperfections in the final product, such as nicks and dents. Indeed, even the placement of fingerprints on the smooth surface which is to be coated can eventually appear as an imperfection in the final coated surface, the end result of which may be rejection of the pan as not commercially saleable in view of the high demands for quality which characterize present day consumers. Even in those instances where no physical degradation of the product due to manipulation preparatory to coating is present, the cost of the manipulation steps adds a substantial increment of cost to the final cost.

In addition to the drawbacks of cost and possible quality defects attendant to the preparation for spraying, many current systems generate additional costs attributable to inefficient spraying. For example, many current systems use a mask system to preclude the sprayed coating from reaching surfaces which are not to be coated. The use of a masking step in the process adds costs, complexity and, possibly, time, depending of course on the extent to which an upstream pan can be masked while a downstream pan is being sprayed so that the process times overlap. Usually, masking is done on the pan to be sprayed after it reaches the spraying station and just prior to spraying, thereby requiring that the spray gun or guns be inactivated while masking is carried out.

Further, many current systems present the pan to the spraying station in a shell up position. This has the disadvantage that the interior shell surface which is to be sprayed will collect tramp materials, such as flecks of solids which float in the area of the immediate environment of the pan, or even water. The presence of foreign substances such as water or flecks of dirt or dust on the surface to be sprayed may produce undesirable surface imperfections which will cause the end product to fail to meet quality standards.

Standard industry installations frequently include a continually moving chain which carries the pan to be sprayed past a stationary spray nozzle. In such a system the spray nozzle is programmed to commence spraying at a time prior to the arrival of the leading edge of the continuously moving pan, and to terminate spraying at a time after the pan passes the spray nozzle. The commencement of spraying before the pan arrives and continuation of spraying for a period after the pan passes the spray nozzle is necessary in order to ensure that all areas on the pan, and particularly the leading edge and the trailing edge of the pan relative to the spray nozzle, are coated. In addition there will be considerable overspray in those installations in which the spray pattern of the spray nozzle or nozzles is arranged to project a spray which impinges on the maximum diameter of the pan at all times. Thus as a consequence of the early on—late off nozzle actuation period, at least, large quantities of make-up air are required as contrasted to the quantity which would be needed if the pan was not axially moving during spraying so that the initial droplets of spray were assured of hitting a receiving surface and the spray could be terminated as soon as a bare surface was no longer presented to the spray. Make-up air is invariably drawn from a location outside the plant in which the spraying installation is located. In summer, the make-up air is almost always at a temperature which is suitable for use in the spraying operation and hence no conditioning of the outside make-up air is required. However, in the winter in northern climes, the outside air must be heated to bring it to a temperature suitable for use in the spraying operation. The heating of large quantities of cold, outside air to properly condition the air for use in the spraying operation is expensive. Hence, it is desirable that a spray system require the minimum possible quantity of make-up air. The use of a lesser quantity of make-up air will, of course, result in a reduced quantity of exhaust air when it is appreciated that the order of magnitude of make-up air required in a current standard installation is on the order of 5,000–10,000 cubic feet per booth per hour.

And finally, overspray of the coating material is a concern in many current installations from the standpoint of efficiency of utilization of the coating material and the cost of maintenance of the system, including filters. All systems use an enclosed chamber in which spraying is done, but nearly always overspray is controlled by means of a single source of suction, usually a fan. Fan sizes can be very large of course but, as a practical matter, capital and operating costs place a practical limit on the spray withdrawal capacity, and often that limit is not high enough to ensure that virtually all of the overspray will enter the withdrawal system. In addition, in most current systems, a very small percentage, at best, of the overspray is collected and re-used due to the diffused character of the overspray particles by the time they reach the filtering mechanism in the withdrawal system flow path.

It has also been observed that conveyor maintenance is a substantial cost item in many current coating systems. Specifically, in many systems the pan is coated while in contact with the conveyor. If a pan is coated on the conveyor a conveyor cleaning device must be added to the system to ensure that pans entering the system will not be fouled by the residue left from prior spraying operations. In other systems in which an attempt is made to spray the pan at a location remote from the conveyor, complicated and costly lifting and handling systems are employed, which systems again raise the possibility of creating imperfections in the final products as well as increasing the cost of production.

For these reasons, among others, no current spraying system can be considered to be the ultimate, or near ultimate system, and the possibilities of cost reduction and quality improvement remain as challenges to the users of such systems.

SUMMARY OF THE INVENTION

The invention overcomes or greatly reduces all the above-described deficiencies and drawbacks of current systems in an economical and efficient way to the end that a high quality, low cost product is produced.

Specifically, the method and apparatus of the present invention provides means for presenting the pan to be coated to the coating station in a top down position so that the surface to be coated is protected from contamination or surface degradation right up to the moment at which the pan is to be grasped and held for the spraying operation.

Further, the system includes means for automatically centering the pan preparatory to spraying which requires no operator intervention. Indeed, the pan centering function is carried out while the pan remains in contact with the conveyor, and while the conveyor continues to operate. Thus there is no need for gearing, clutching and braking of the conveyor each time the pan is prepared for spraying; the conveyor merely continues to operate, sliding under the pan for whatever dwell time the pan is required to be held stationary preparatory to being presented to the spray guns. Further, due to the continuous operation of the conveyor, a just-sprayed pan may be placed on the conveyor and discharged from the spraying station immediately following removal of an unsprayed pan from the conveyor preparatory to presentation to the spray guns.

Once in the spraying station a pan to be sprayed is grasped and rotated about a stationary axis so that only the pan, a light and easily manipulated object, is spun, not components of the spraying system. Indeed, all components of the spraying system may be fixed in place, thus doing away with any need to provide movement capabilities for the spray guns, beyond a simple angle adjustment, or any other component of the spray system except a pan grasping device, thus simplifying operation and reducing capital and operating costs.

In addition, since the pan, though rotated, is axially stationary during spraying, the spray pattern can be adjusted to be directed to impinge on the pan surface only, and to be discontinued at the exact moment when the desired layers of coating have been deposited; i.e., the spray can be very focused in terms of area to be covered and time duration of spraying. As a result, a minimum or near minimum amount of make-up air is required. Indeed in one installation, only about one half of the amount of make-up air is required as contrasted to a current standard system for coating the same product.

The spraying operation is optimized by the use of a dual exhaust arrangement consisting of a localized and a general exhaust system, said dual systems being located one within another so that the overspray is initially directed along a common path into the dual system and a single flow path traps and collects almost all overspray. By positioning the localized system in almost abutting proximity to the pan, the very great majority of the overspray can be directed into the localized system and immediately collected in liquid form and recycled without further treatment.

The suction power of the two systems is combined at the originating point of overspray at the edge of the pan most remote from the spray gun nozzles so that maximum collection of overspray in the two systems, and the deposition of overspray outside the exhaust system, is minimized or even, possibly, eliminated altogether, thus doing away with the need for periodic cleanup of the spray booth and surrounding equipment attributable to spray particles which elude the exhaust system.

And finally, the system includes means for rotating the pan at a very high rate of speed during the spray gun operation so that a large number of individual layers of coating material are applied in the application of a single coating, thereby providing a coating which is less subject to chipping and other surface degradation as contrasted to current spraying systems.

BRIEF DESCRIPTION OF THE DRAWING

The invention is illustrated more or less diagrammatically in the accompanying drawing in which:

FIG. 4 is a side elevation to an enlarged scale as contrasted to FIG. 3 of the spray gun set-up at a coating station with parts broken away for clarity;

FIG. 5 is a section through a vessel which has been coated illustrating the multiple layers of coating which may be applied;

DESCRIPTION OF A SPECIFIC EMBODIMENT

Figure 1:
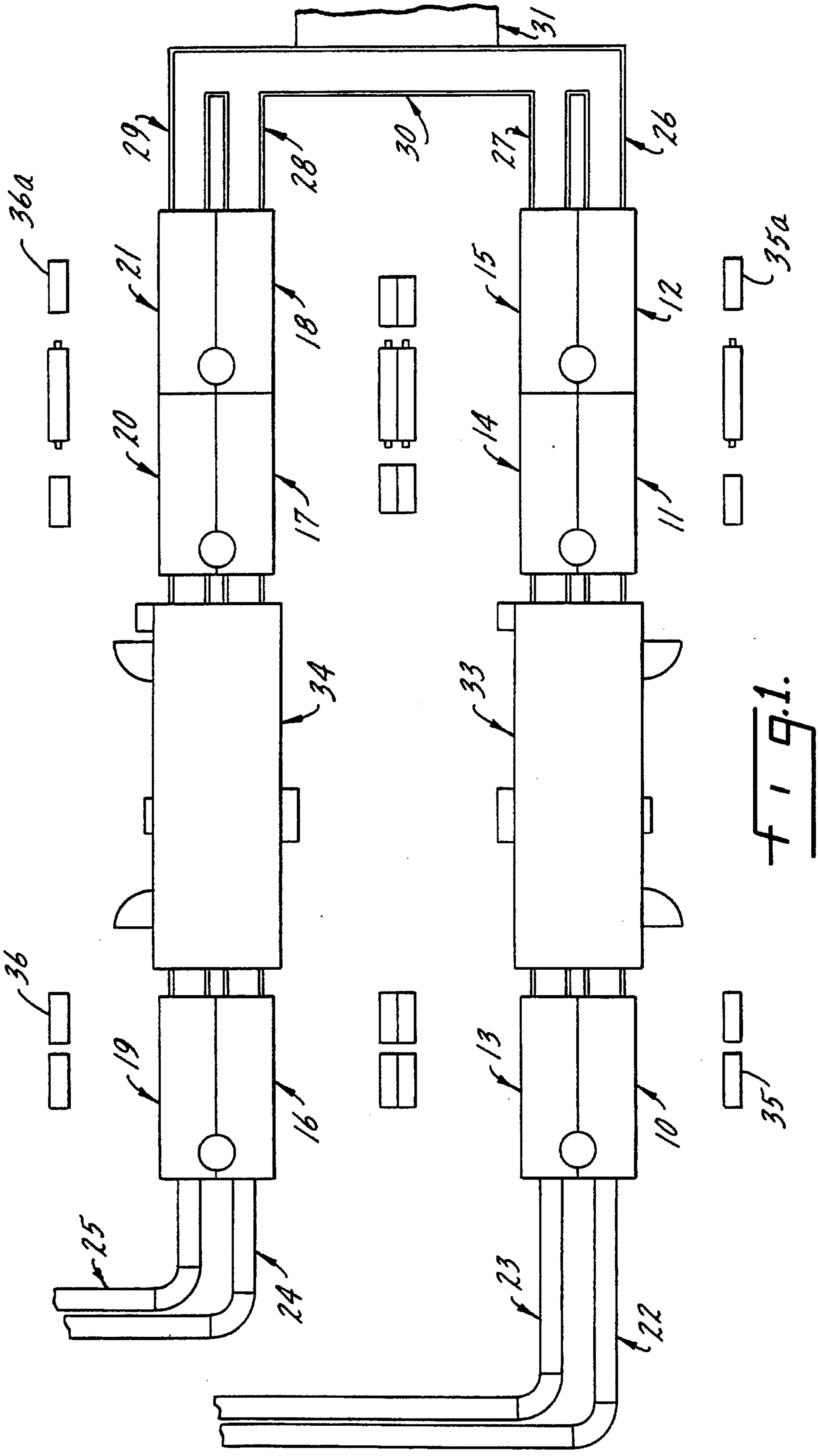
FIG. 1 is a diagrammatic top plan view of a 12-station production line incorporating the invention of this application.

Like reference numerals will be used to refer to like or similar parts from Figure to Figure in the accompanying drawing.

It will understood that the method and apparatus of the present invention and the resultant multi-layered coated product can be utilized in a stand alone configuration. However, it is particularly well adapted for multiple applications in high volume production because of the speed with which an individual pan may be coated. Hence, in FIG. 1, a multiple, in this instance twelve, station installation is shown. The spraying stations are indicated generally at 10, 11, 12, 13, 14, 15, 16, 17, 18, 19, 20 and 21. Feed conveyors are indicated generally at 22, 23, 24 and 25. The feed conveyors supply pans to be coated to banks of three coating stations. Thus conveyor 22 supplies spraying stations 10, 11 and 12, conveyor 23 supplies stations 13, 14 and 15, and so on. Takeaway conveyors are indicated generally at 26, 27, 28 and 29, each serving the three spraying stations immediately upstream therefrom, all of said takeaway conveyors feeding onto a collecting conveyor indicated generally at 30 from which the coated pans enter a subsequent processing stage indicated generally at 31. The subsequent processing stage may, for example, be a grinding or smoothing operation in which excess rim material is removed or the sharp edge of the rim is rounded preparatory to attachment of a handle. A pair of oven systems are indicated generally at 33, 34, system 33 serving spraying stations 10–15, and system 34 serving spraying stations 16–21. Electrical consoles are associated with each spraying station, or spray booth, of which representative consoles are indicated at 35, 36. A valve bank is also associated with each spray booth of which representative banks are indicated at 35*a*, 36*a*. It will be understood that suitable actuating means, pneumatic and hydraulic lines, and associated valves, are required to initiate, perform and terminate the functions associated with each spray booth. However, since those functions do not of themselves form the invention and their adjustment to carry out the hereinafter described functions are within the skill of the art, they are not further illustrated or described.

Figure 2:
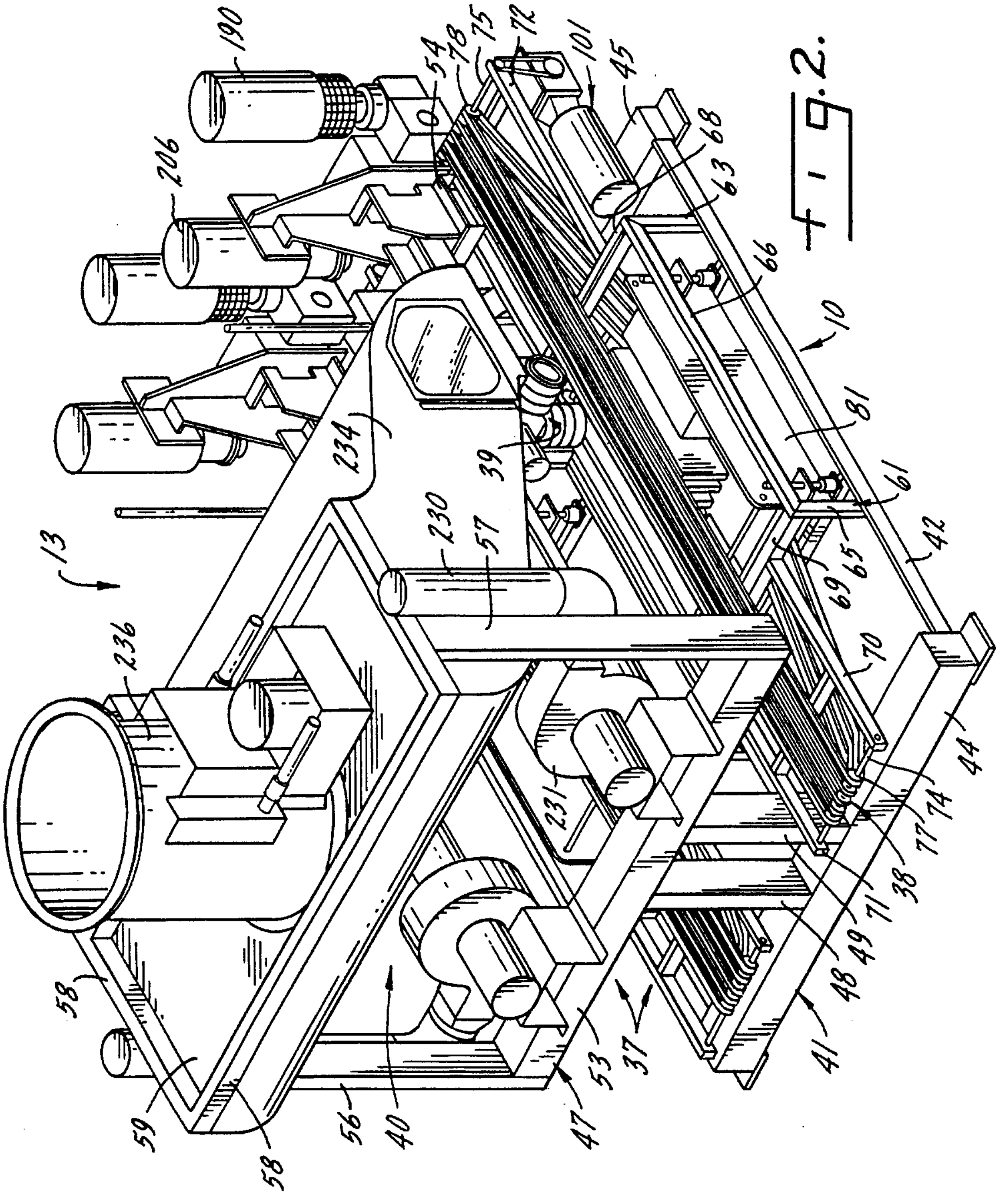
FIG. 2 is a perspective view of a pair of side-by-side coating stations of this invention with parts omitted for clarity.

A pair of spray booths such as booths 10 and 13 are illustrated in FIG. 2. Referring to spray booth 10, a framework is indicated generally at 37, a station conveyor assembly is indicated generally at 38, an indexing assembly is indicated generally at 39, and a dual exhaust system is indicated generally at 40.

The framework 37 includes a floor frame indicated generally at 41 having side rails, one of which is illustrated at 42, and cross frame members 44, 45. The exhaust system frame, indicated generally at 47, includes a pair of upstream uprights 48, 49 and a pair of downstream uprights, one of which is indicated at 50, see FIG. 3. A pair of stringers, one of which is indicated at 51, see FIG. 3, extend between aligned uprights. A superstructure frame includes box cross member 53 which is welded to uprights 48, 49, and channel member 54 which extends between the downstream uprights. Upwardly extending stack supports 56, 57 are welded to the ends of box cross member 53 and support a steel platform having front, rear and side rails 58 and platform 59.

The station conveyor assembly 38 is illustrated best in FIGS. 2, 3, 8 and 9. A station frame assembly is indicated generally at 61, said frame assembly including a pair of side frames, the right side frame, looking in a downstream direction, having bottom rail 62, front uprights 63, 64, see FIG. 6, rear uprights 65 and top rail 66. Front and rear cross braces are indicated at 68, 69. A pair of rear extensions are indicated at 70, 71 and one of two similar pair of front extensions at 72. A rear belt roller shaft is indicated at 74 and a front belt roller shaft at 75. Rear shaft 74 carries a series of grooved rollers 77 and front shaft carries a similar series of aligned grooved rollers 78.

Figure 3:
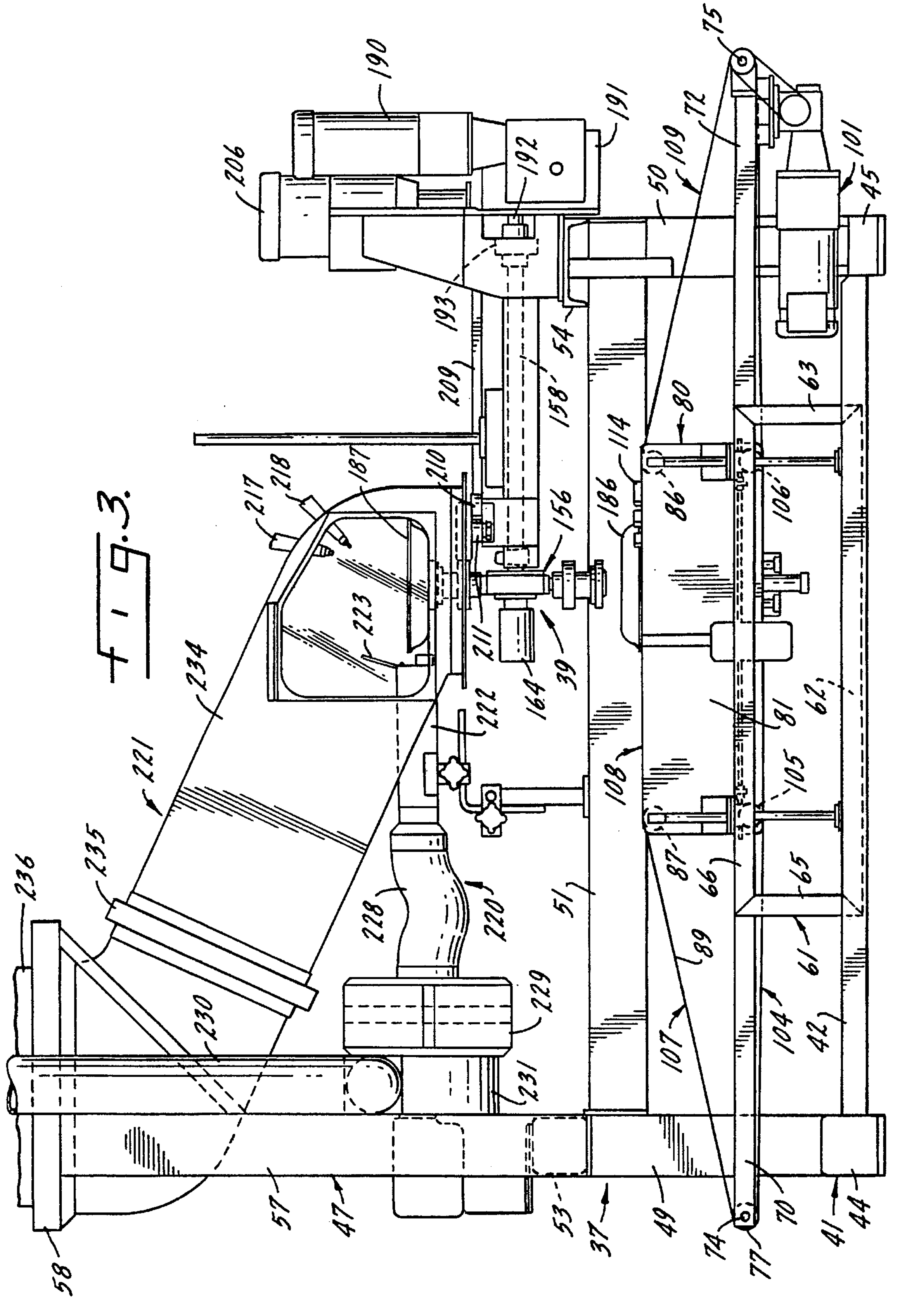
FIG. 3 is a side elevation of a coating station.
Figure 6:
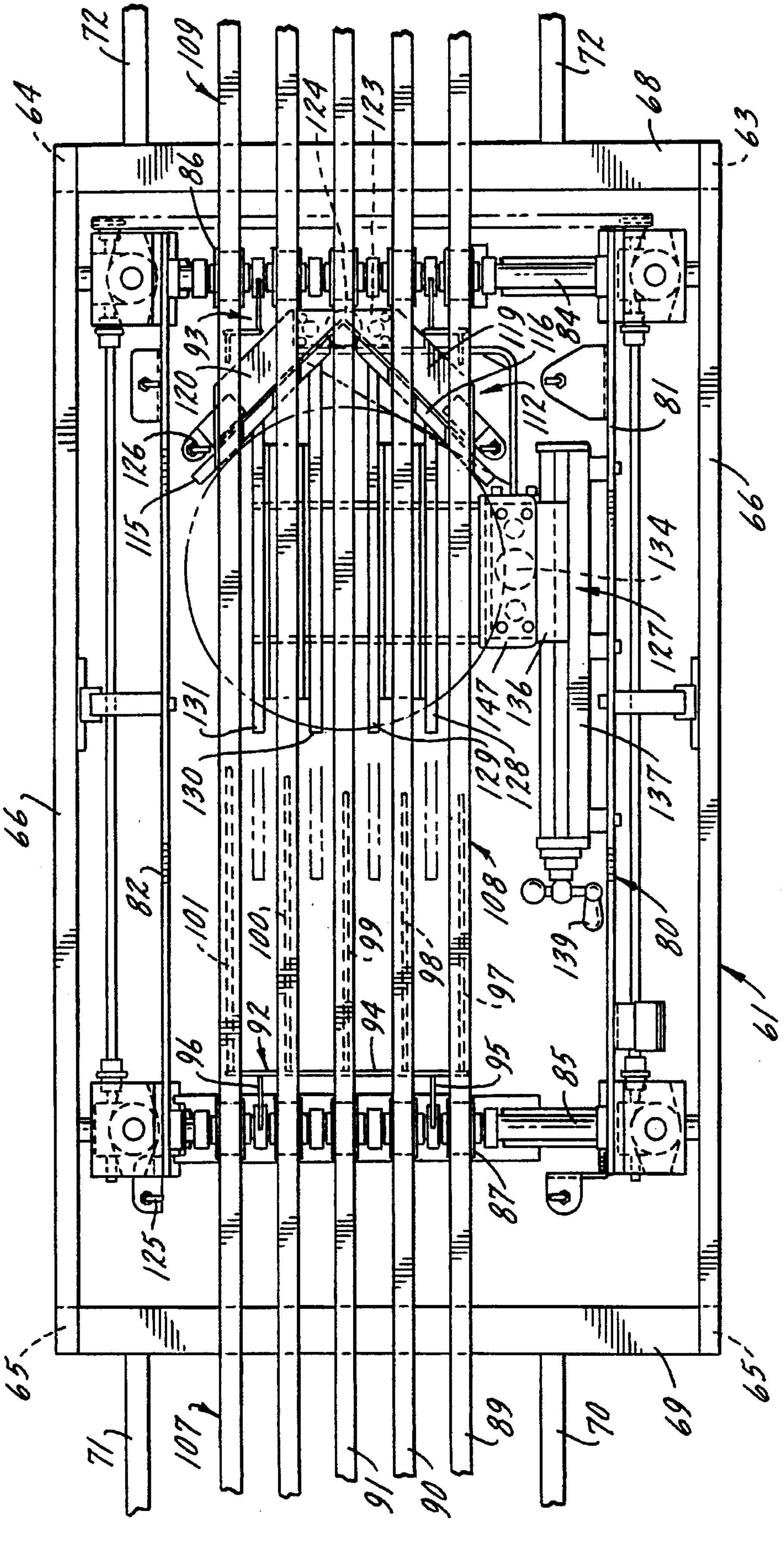
FIG. 6 is top plan view with parts omitted for clarity of the processing section of the conveyor illustrating particularly the pan centering and pan lift features.
Figure 9:
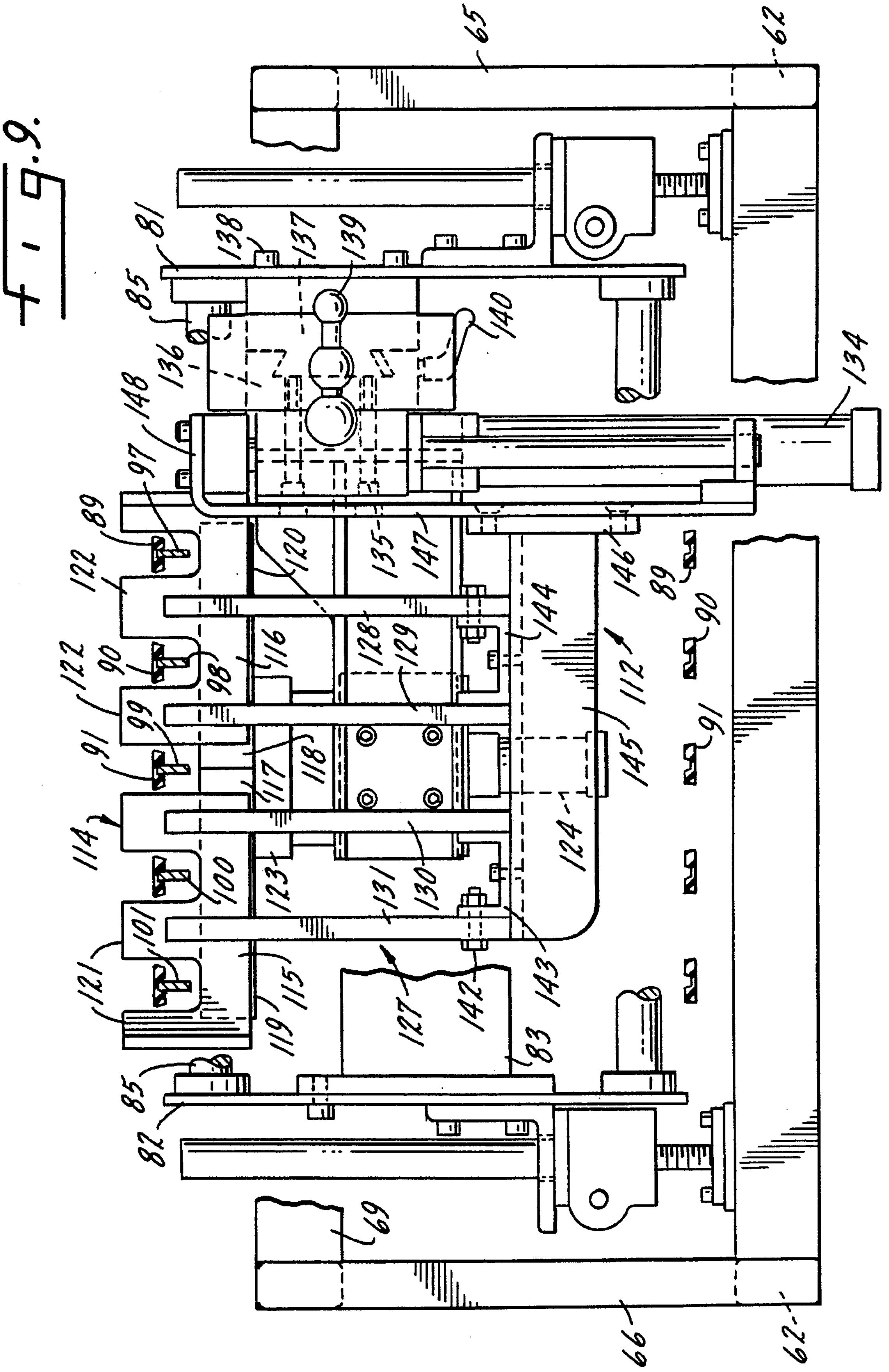
FIG. 9 is a rear view taken on the downstream side of the processing section of the coating station and illustrating particularly upstream and showing the center position stop system and the pan lift system.

A frame for the pan centering and pan lifting assembly, to be described hereinafter, is indicated generally at 80. The frame 80 includes side plates 81, 82, which are secured to the conveyor station frame assembly 61, see FIG. 9, and spaced from one another by spacers, one of which is indicated at 83, see FIG. 9. A pair of roller shafts extend between the front, or downstream, upper right corners of the side plates 81, 82, and at the rear, or downstream, upper left corner thereof, the front shaft being indicated at 84 and the rear shaft at 85, see FIGS. 6. Front shaft 84 carries a series of rollers 86 and rear shaft 85 carries a similar series of grooved rollers 87 which are aligned with the front rollers, see FIGS. 3 and 6. A plurality of flexible belts, in this instance five, is indicated at 89, 90, 91, etc., the top receiving surfaces of the belts being flat and the bottom surfaces being grooved, all as best seen in FIG. 9. Aligning means for ensuring that the belts remain in perfect alignment as they traverse the pan lift assembly are indicated generally at 92 and 93. Aligning means 92 includes a cross member 94 which is connected by struts 95, 96 to shaft 85. A plurality of alignment belt supports is indicated at 97, 98, 99 100 and 101. A similar mounting arrangement for front alignment of the supports, see FIG. 9, is shown at 93 in FIG. 6. The lower run of the belts is indicated generally at 104 in FIG. 3. The lower run may advantageously pass over belt tightening rails 105, 106. As best seen in FIG. 3, the upper run of the belts consists of an upwardly inclined entry section 107, a flat, processing section 108, and a discharge section 109, all as best seen in FIGS. 3 and 6. The conveyor drive system which powers the front drive shaft 75 is indicated generally at 110 in FIGS. 2 and 3.

It will be understood that the first step in the spraying sequence after a pan leaves the entry section 107 and enters the processing section 108 of the station conveyor assembly 38 is to stop or arrest the forward movement of the pan and center it for subsequent pickup by the vacuum indexing assembly. This is accomplished by an arrestor and centering assembly indicated generally at 112 in FIGS. 6 and 9.

The arrestor and centering assembly, hereinafter sometimes referred to simply as a pan centering assembly, consists of an upwardly and downwardly movable V-shaped abutment plate indicated generally at 114 in FIG. 9. The plate 114 is composed of two sections 115, 116 which are bolted to a similar V-shaped bracket having vertical wall sections 117, 118, and horizontal flanges 119, 120. As best seen in FIG. 9, each section 115, 116 of abutment plate 114 is formed with a plurality of extensions 121, 122. The extensions project into the spaces between, and above, the upper surfaces of belts 89, 90, 91 when in an upwardly extended position as shown in FIGS. 3 and 4. The abutment plate 114 extends a distance sufficient to intercept the pan or other vessel to be coated which has been brought to the coating station by the belts 89, 91. In a retracted position as can be visualized in FIG. 9 the upper edges of the extensions 121, 122 will be below the upper surfaces of the belts 89–91 so that the belt, which preferably moves continuously, can function to convey a pan which has been coated away from the coating station. The center edge portions of flanges 119, 120 of the pan centering device are bolted to a ram head 123 which is elevated and retracted by centering stop piston 124. It will be understood that actuation of the pan centering devices can be controlled by any suitable means such as a sensor 125, see FIG. 6, which senses the presence of a pan and, by operation of suitable and conventional electric and/or pneumatic circuits, causes piston 124 to extend, thus raising the abutment plate 114 to the FIG. 9 position prior to the time the pan, which was sensed at 125, reaches the centering position. Another sensor 126, see FIG. 6, will sense the subsequent absence of a pan and cause the abutment plate 114 to move downwardly to a position in which the finger extensions 121, 122 are retracted below the upper surfaces of belts 89, 90, 91 so as to present no interference with the placement of a coated pan on the conveyor or its subsequent downstream movement away from the coating station.

In the next step in the spraying sequence a centered pan is elevated to a position in which it can be grasped by the indexing head preparatory to placement in front of the spray gun. The means for elevating a pan are illustrated in FIGS. 4, 6, 8 and 9, and particularly FIGS. 6, 8 and 9. The pan lift is illustrated in a down, retracted condition in FIGS. 6, 8 and 9 and in an elevated position in FIG. 4.

Referring initially to FIGS. 6 and 9, means for lifting a pan which has been centered is illustrated at 127, the lifting means comprising, in this instance, four pan lift plates 128, 129, 130 and 131. The pan lift plates are positioned in the four spaces formed between the five belts, and extend into the maw formed by the V-shaped pan centering plate 114. As seen in FIGS. 4 and 6, an inside plate 129 extends slightly further forwardly in a downstream direction than does a side plate 128 due to the configuration of the V-shaped abutment plate 114.

Figure 8:
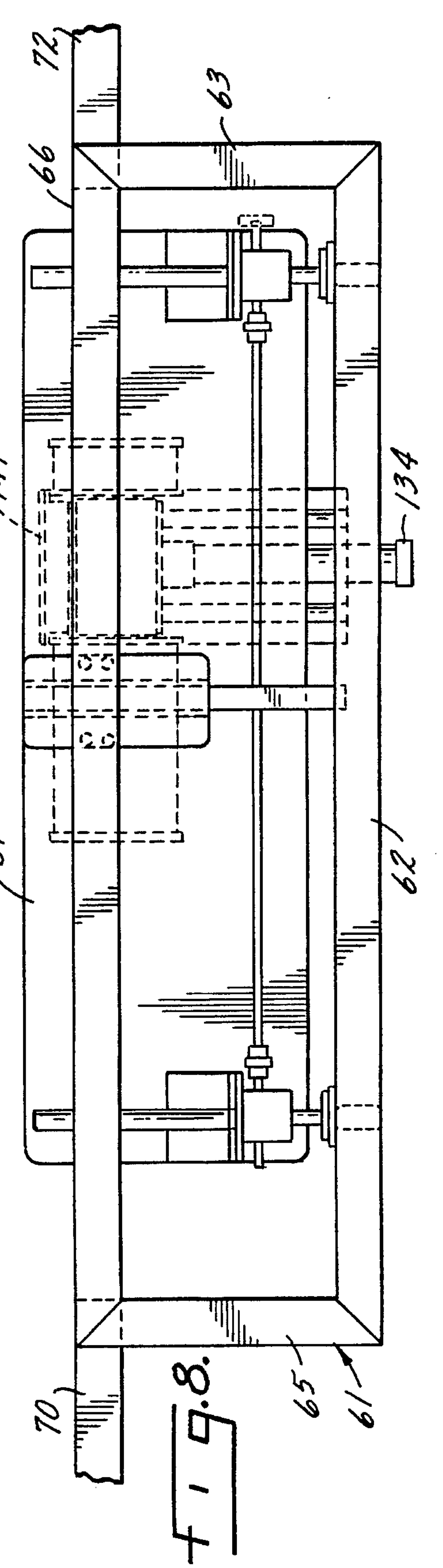
FIG. 8 is a side view of the pan lift system.

Means for raising and lowering the pan lift plates include a pan lift piston and cylinder assembly which is indicated at 134 in FIGS. 6, 8 and 9. The piston and cylinder assembly 134 is bolted or otherwise suitably secured as at 135 to the sliding half 136 of a dove-tailed slide way, the stationary half being indicated at 137. The slide way is bolted, as at 138, to pan lift side plate 81, and an adjustment screw for the slide way is indicated at 139, and a lock screw at 140. The maximum upstream position to which the pan lift plates 128–131 can be moved is indicated in phantom lines in FIG. 6 to the left of the illustrated solid line position.

The pan lift plates 128–131 are secured, as by bolts 142, to a pair of U-shaped brackets 143, 144, see FIG. 9, which in turn are bolted to a base plate 145. The base plate in turn is welded or otherwise suitably secured to an attachment plate 146 which in turn is attached by bolts or other suitable means to an inverted L-shaped mounting plate 147. The upper, short leg portion 148 of the mounting plate is bolted to the ram head of piston 134 so that retraction of the piston of piston and cylinder assembly 134 to the FIG. 9 position will withdraw the pan lift plates 128–131 to the illustrated, inactive position of FIG. 9, and extension of the piston in piston and cylinder 134 will elevate the pan lift plates to the position of FIG. 4.

It will be understood that actuation of piston and cylinder assembly 134 is under the control of suitable sensors and operates in a fashion similar to the operation of the pan centering system 112; that is, valve means for admitting pressure fluid to the piston and cylinder assembly 134 are actuated by sensors and electronic circuitry which may function, for example, to cause the piston and cylinder assembly 134 to be activated only after the forward movement of a blank has ended, and the blank has come to rest in the centering system 112, and, preferably, after the spray guns, to be described hereafter, have completed spraying a vessel in the spraying station. Since such expedients are well within the skill of the art and do not per se comprise the invention they are not further illustrated or described.

Figure 10:
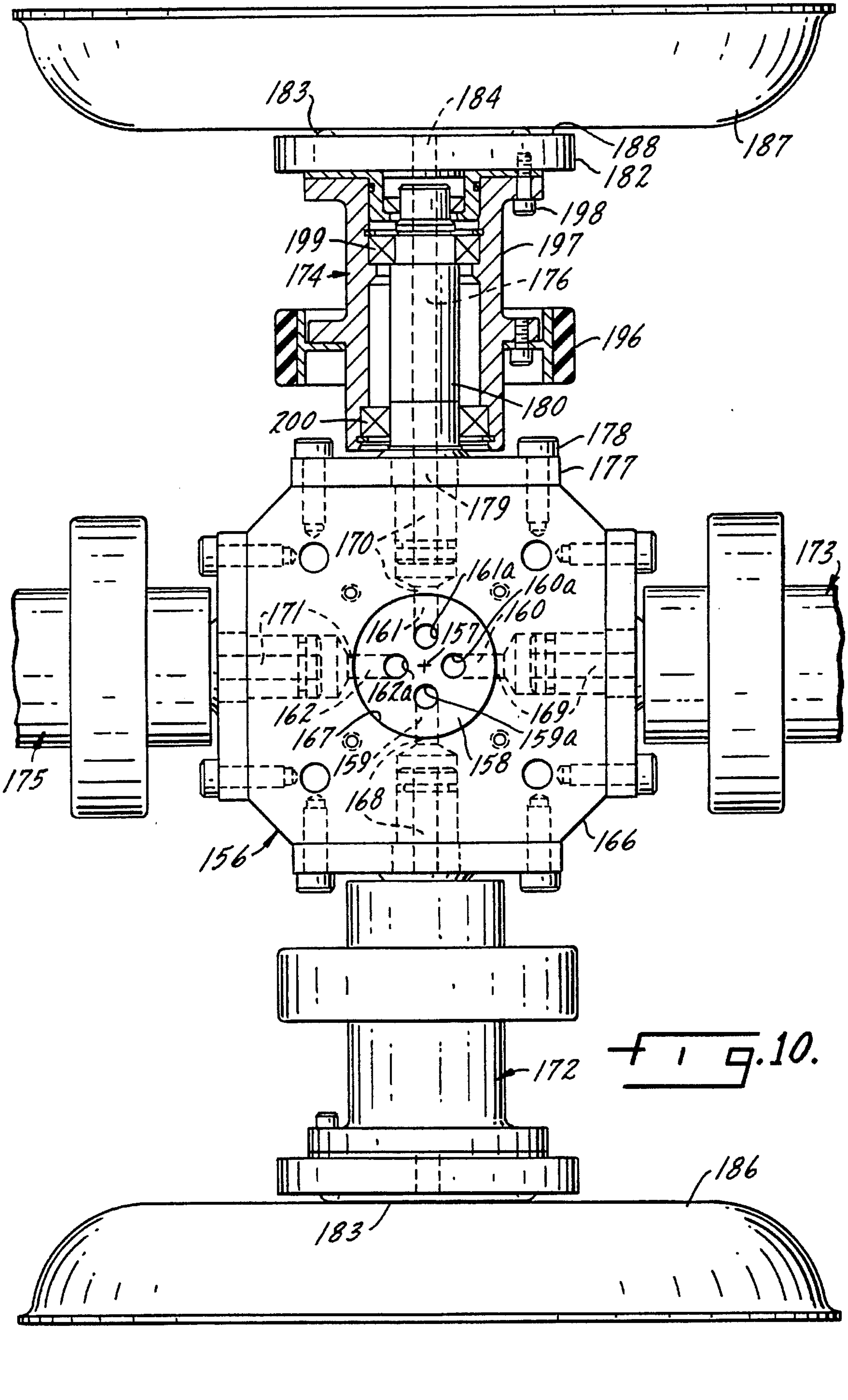
FIG. 10 is a detailed view of the pan index system.

Upon actuation of the pan lift plates 128–131 to the position of FIG. 4, the pan which has just broken contact with the belts in conveyor processing section 108 of the station conveyor assembly 38 is presented to the indexing assembly 39, illustrated best in FIGS. 3, 4, 7 and 10. The indexing assembly 39 includes a rotary spin head, indicated generally at 156, which rotates about an axis 157, see FIGS. 4 and 10, parallel to the run of the station conveyor 38. The spin head 156 includes a stationary shaft 158 having four vacuum ports 159, 160, 161, 162 spaced equidistantly about its circumference. Each of the ports 159–162 communicates with an associated passage 159*a*, 160*a*, 161*a* and 162*a*, respectively, which communicates with a vacuum pump 164, see FIGS. 3, 4 and 7. Spin head 156 further includes a rotating block 166, best illustrated in FIG. 10, which has a central bore 167 therein which receives the shaft 158. The block 166 includes four passages 168, 169, 170 and 171 which are aligned, respectively, with vacuum ports 159–162 of shaft 158 in the at rest, operating condition illustrated in FIG. 10. Four vacuum heads are indicated at 172, 173, 174 and 175, each vacuum head having an associated vacuum passage, one of which is indicated at 176. The vacuum head 174 is connected to spin head 156 by a connector plate 177 and bolts 178, connector plate 177 having a vacuum passage 179 in shaft 180 which projects out of spin head 156, the vacuum passage 179 being aligned with vacuum head passage 176 and block passage 170 when assembled as shown in FIG. 10. The vacuum head 174 terminates in a pick up plate 182 which carries a continuous sealing ring 183, see the lower portion of FIG. 10, the sealing ring 183 surrounding a terminal vacuum port 184. Thus when a pan blank 186 is pressed into contact with the sealing ring 183 of the vacuum head 172, the vacuum connection between the space between the pan blank 186 (or 187 when the pan blank is in the uppermost or spraying position of FIG. 10), and also the 90° pre-spraying position and the 270° post-spraying position, and vacuum pump 164 is established, with respect to vacuum head 174, via vacuum port 184, vacuum head passage 176, connecting plate vacuum passage 179, block passage 170, stationary shaft vacuum port 161 and vacuum port passage 161*a*. Since sealing ring 183 is located a substantial radial distance away from the axis of terminal vacuum port 184, a stable support for pan 187 is provided as contrasted, for example, to the condition which would exist if pan 187 was pressed flat against the outer face 188 of pick up plate 182, particularly if the outer face 188 had surface irregularities which would preclude mirror flat abutting contact with the pan 187.

Figure 7:
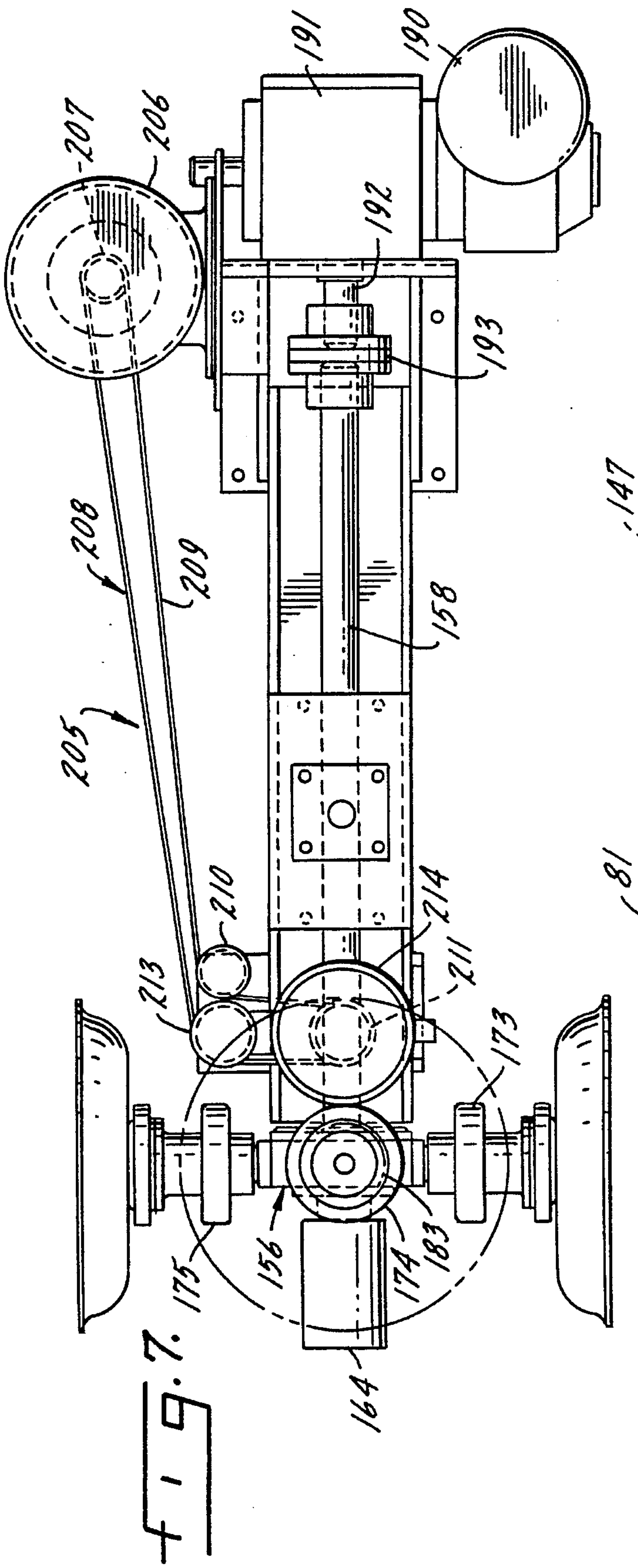
FIG. 7 is a top view of the indexing mechanism and the vessel rotating system for a vessel at the coating station.

Means for indexing the rotary spin head 156 are shown best in FIGS. 3, 4 and 7. Referring initially to FIGS. 3 and 7, an indexing motor, indicated at 190, drives a gear box 191 from which power take off shaft 192 projects toward the rotary spin head 156. A coupling 193 connects the power take off shaft 192 to shaft 158 which, as described above, is connected to spin head rotating block 166 by any suitable means, such as key and slot, not shown. Thus intermittent actuation of indexing motor 190 will cause intermittent indexing of one quarter of a complete revolution of shaft 158 and rotary spin head 156, the one quarter increments of rotation representing 360°/0°, 90°, 180°, 270°, and 360°/0 positions of the spin head 156.

Means for rotating a pan during the "spray on" condition of the spray guns are illustrated best in FIGS. 7 and 10, and also in FIG. 3. Said means include a spin wheel system associated with each vacuum head which is frictionally driven by a friction drive wheel. Since the spin wheel system associated with each of the vacuum passages 172, 173, 174 and 175 is identical, only the system of vacuum head 174 will be described in detail.

Referring first to FIG. 10 primarily, a driven friction collar is indicated at 196 on vacuum head 174. The collar 196 is bolted to the cylindrical shell 197 of vacuum head 174. The shell 197 is bolted to pick up plate 182, as at 198, so the pick up plate, and a pan 187 when in vacuum engagement with plate 182, are an integral unit and the shell and an associated pan will rotate as a unit. Shell 197 is mounted on bearings 199, 200 which surround shaft 180. The junctions between the shaft 180 and spin head 156, and between the shaft 180 and shell 197, carry suitable vacuum seals so that subatmospheric pressure generated in vacuum port 161*a* exists in the space formed between the outer face 188 of pick up plate 182, the sealing ring 183 and the bottom of pan 187.

Friction collar 196 is driven by a friction drive system indicated generally at 205 in FIG. 7. The friction drive system 205 includes a spin motor 206 having a power take off pulley 207 which drives a belt indicated generally at 208. The return run 209 of belt 208 wraps around a belt tightening pulley 210, a driven pulley 211 mounted on shaft 21 and direction changing pulley 213. A friction drive wheel is indicated at 214, the friction drive wheel being mounted on the shaft 212 above driven pulley 211. Drive wheel 214 is composed of a suitable friction material, preferably non-metallic, and has a slight degree of resilience. It has a diameter of a size sufficient to make abutting contact with driven friction collar 196 when the spin head 156 is in the 180° position, considering the position of pan 186 in FIG. 4 to be at the 0° position.

Spin motor 206 is a variable speed motor. It runs continuously at selected speed. As the fixture rotates to 180° position, the drive wheel 214, which is spring loaded, backs up slightly as driven wheel 173 rotates. As driven wheel 173 rotates away from drive wheel 214, the shell stops rotating at the 270° position by bearing friction.

Thus when the spin motor 206 is actuated by suitable sensors, driven friction collar 196 will be similarly rotated, the period of rotation commencing a moment before, and ending a moment after, the "spray on" condition of the spray guns. It will be understood that, referring to FIG. 7, the phantom line circle represents the outline of a pan on belt processing section 108 and, also, in the spray booth, while the upper outline of a pan represents a pan in the spray ready position preparatory to entering the spray station, and the bottom outline represents a pan which has been sprayed and is being prepared to be returned to belt processing section 108 of the conveyor 38 preparatory to transfer to a subsequent processing station. It will thus be seen that a pan blank makes a 360° rotation in a plane transverse to the direction of movement of the conveyor and does so in four 90° increments of movement consisting (1) conveyance to a spray ready position, (2) spray ready to spraying position, (3) spraying to discharge ready position, and (4) discharge ready position to discharge position in which it is placed back in contact with the continuously moving conveyor 38.

The system for spraying a raw blank is illustrated best in FIGS. 3 and 4. Referring primarily to FIG. 4 it will be seen that a pan 187 has been lifted from belt processing section 108 of the conveyor 38 and indexed to, firstly, the spray ready position shown in FIG. 7 and then, secondarily, to the spraying position of FIGS. 3 and 4. In the spraying position of FIG. 4 spray guns 216, 217 are actuated by suitable sensors to project a spray 218 against the inside surface of the pan a moment after the friction pan drive system of FIG. 7 has begun to spin the pan at a high rate of speed.

The unique dual exhaust system of the invention is illustrated best in FIGS. 3 and 4. Referring primarily to FIG. 4, a localized exhaust system is indicated generally at 220 and a general exhaust system at 221. The localized system 220 includes an exhaust header 222 having a deflector 223 on its upper surface to intercept overspray and direct the overspray droplets into the opening 224. A collector pan 225 is placed in the opening of the header near the entrance with, preferably, a portion of the pan extending outwardly beyond the edge of opening 224 toward pan 187 which is being sprayed. Preferably a pan deflector 226 projects above the top edge of collector pan 225 and into close proximity to the left edge of pan 187. Placement of the collector pan 225 and its deflector 226 close to the edge of pan 187 will intercept and collect the great bulk of the overspray. Specifically, the great bulk of the overspray intercepted by localized exhaust system 220 will strike the pan deflector 226 and drop into pan 225 where it collects and may be re-used. The slight excess will be deflected by a header deflector 223 and will drain downwardly where it will fall into pan 225 after passing through the narrow opening 227 between the back of header deflector 223 and pan 225.

The suction air will pass from header 222 through expansion sleeve 228, see FIG. 3, thence through small filter 229 and out stack 230, see FIGS. 2 and 3. The fan for the localized exhaust system is indicated at 231 in FIG. 2.

The general exhaust system includes a station hood 234, which services two side-by-side stations as illustrated in FIG. 1, whose entry end extends over the spray guns and downwardly to a position approximately level with the collar 196 and friction drive wheel 214 of the pan spin system. A large filter is indicated at 235 and a discharge stack at 236, see also FIG. 2. Preferably, the localized system stack 230 and the general system stack 236 are connected downstream from the illustrate position so that only a single stream of effluent discharges from the exhaust system.

The unique scratch and chip resistant product produced by the above-described method and apparatus is illustrated diagrammatically and to an exaggerated scale for purposes of description in FIG. 5. In this Figure a portion of the bottom and the transition section where the bottom and side wall of the pan meld into one another is indicated at 238. A primary coating is indicated at 239, said primary coating consisting, in this instance, of three layers 240, 241 and 242. A finish coating is indicated 244, said finish coating consisting, in this instance, of three layers 245, 246 and 247. A top coating is indicated at 249, said top coating consisting, in this instance, of three layers 250, 251 and 252.

The fact that nine layers can be placed onto the interior surface 253 of the pan on a production basis at the rate of twelve or more pans per minute per line is possible because of the speed with which the pan is spun by the pan drive system, the preparation for spraying (i.e.: the lifting of the pan into contact with the indexing head) while a prior pan is being sprayed, and the continuous operation of the conveyor at all times so that no dwell time is traceable to conveyor operation.

It will thus be seen that a method and apparatus for quickly, efficiently and economically spraying objects such as cookware vessels on a high production basis having minimum capital and operating cost has been provided, along with a unique chip and dent resistant product, and that all of the objects and advantages earlier mentioned in the foregoing description have been achieved.

It will at once be apparent to those skilled in the art that various modifications and refinements may be made by those skilled in the art within the spirit and scope of the invention. Accordingly it is intended that the scope of the invention be limited solely by the scope of the hereafter appended claims when interpreted in light of the relevant prior art, and not by the foregoing exemplary description.

We claim:

1. Apparatus for applying a coating to a vessel, said apparatus including a continuously operating conveyor which conveys a vessel to be coated to a spraying station vertically aligned with the conveyor, means for arresting the forward movement of the vessel at the spraying station while maintaining the vessel in sliding contact with the conveyor as the conveyor continues to operate, means for breaking physical contact between the vessel and the conveyor, means for presenting said vessel to the spraying station in an inverted position following separation of the vessel from the conveyor, means for spraying the vessel positioned and arranged in said spraying station, means for rotating the vessel at a high rate of speed at the spraying station whereby a coating applied by the spraying means consists of a plurality of layers, and means for re-contacting the coated vessel with the continuously operating conveyor whereby the coated vessel is discharged from the spraying station.

2. The apparatus of claim 1 further including means for positioning the vessel after its movement is arrested so that the vessel is accurately presented for engagement with the means for presenting.

3. The apparatus of claim 1 further including an exhaust system at the spraying station consisting of a localized exhaust system and a general exhaust system.

4. The apparatus of claim 3 wherein the localized exhaust system has an exhaust path positioned and arranged to be adjacent the vessel.

5. The apparatus of claim 4 wherein the localized exhaust system is positioned and arranged to entrap overspray.

6. The apparatus of claim 5 wherein the localized exhaust system and the general exhaust system discharge through a common conduit.

7. The apparatus of claim 1 wherein the means for presenting the vessel to the spraying station includes vacuum means arranged to hold said vessel while said vessel is out of contact with the continuously moving conveyor.

8. The apparatus of claim 7 wherein the means for presenting the vessel to the spraying station further includes means for rotating the vacuum means as well as the vessel at the spraying station whereby said vessel and said vacuum means rotate as a unit at the spraying station.

9. The apparatus of claim 8 further including an exhaust system at the spraying station consisting of a localized exhaust system and a general exhaust system.

10. The apparatus of claim 9 wherein the localized exhaust system has an exhaust path positioned and arranged to be adjacent the vessel.

11. The apparatus of claim 10 wherein the localized exhaust system includes a coating collection pan and deflector means which direct overspray into said coating collection pan.

* * * * *